United States Patent
Kautsch

(10) Patent No.: US 6,182,777 B1
(45) Date of Patent: Feb. 6, 2001

(54) SUSPENSION SYSTEM FOR A WORK MACHINE

(75) Inventor: Dewaine A. Kautsch, DeKalb, IL (US)

(73) Assignee: Caterpillar Inc., Peoria, IL (US)

( * ) Notice: Under 35 U.S.C. 154(b), the term of this patent shall be extended for 0 days.

(21) Appl. No.: 09/208,188

(22) Filed: Dec. 9, 1998

(51) Int. Cl.$^7$ .................................................. B62D 55/00
(52) U.S. Cl. ........................................................ 180/9.48
(58) Field of Search ...................... 180/9.1, 9.5, 9.54, 180/9.58, 9.6, 9.48; 280/124.169, 124.177, 788, 124.111, FOR 173, FOR 132, 5.519, 6.154, 5.5; 267/292; 305/124, 131, 134

(56) References Cited

U.S. PATENT DOCUMENTS

| | | | |
|---|---|---|---|
| 2,534,772 | * 12/1950 | Howard | 305/9 |
| 2,681,231 | * 6/1954 | Kondracki | 180/9.48 |
| 2,786,724 | 3/1957 | Armington et al. . | |
| 3,037,571 | * 6/1962 | Zelle | 180/9.48 |
| 3,759,541 | 9/1973 | Peterson | 280/112 R |
| 3,820,616 | * 6/1974 | Juergens | 180/9.48 |
| 4,220,216 | 9/1980 | Ringness | 180/9.5 |
| 4,232,754 | 11/1980 | Corrigan et al. | 180/9.5 |
| 4,341,276 | 7/1982 | Furuichi | 180/9.48 |
| 4,350,222 | 9/1982 | Lutteke et al. | 180/209 |
| 4,357,032 | * 11/1982 | Kenyon | 280/681 |
| 4,690,231 | * 9/1987 | Riml | 180/6.48 |
| 4,743,046 | * 5/1988 | Schnittger | 280/707 |
| 4,749,210 | * 6/1988 | Sugasawa | 280/707 |
| 4,834,478 | * 5/1989 | Stevens et al. | 305/21 |
| 5,018,591 | 5/1991 | Price | 180/9.5 |
| 5,024,465 | * 6/1991 | Baiker | 280/840 |
| 5,072,800 | 12/1991 | Price | 180/9.48 |
| 5,213,315 | * 5/1993 | Hartel et al. | 267/292 |
| 5,293,948 | 3/1994 | Crabb | 180/9.1 |
| 5,293,949 | * 3/1994 | Zimmermann | 180/9.48 |
| 5,368,115 | 11/1994 | Crabb | 180/9.1 |
| 5,377,962 | * 1/1995 | Ochs et al. | 267/281 |
| 5,622,234 | * 4/1997 | Nagorcka et al. | 180/9.5 |
| 5,638,908 | * 6/1997 | Masumoto et al. | 180/9.48 |
| 6,027,185 | * 2/2000 | Crabb | 305/148 |

FOREIGN PATENT DOCUMENTS

| | | |
|---|---|---|
| 0 479 016 | 4/1992 | (EP) . |
| 0723 905 | 7/1996 | (EP) . |

* cited by examiner

*Primary Examiner*—Brian L. Johnson
*Assistant Examiner*—G Klebe
(74) *Attorney, Agent, or Firm*—Jeffrey A. Greene

(57) ABSTRACT

Existing track laying work machines fail to provide adequate suspension for reducing shock loads transmitted to machine components and the operator. The present suspension system provides suspension members interposed the main frame of the work machine and an elongated beam supported by first and second track roller frames. Cushioning members separate the roller frame from the elongated beam and drive wheel hub, to provide further isolation from shock and torsional movement of the roller frame.

21 Claims, 6 Drawing Sheets

SUSPENSION SYSTEM FOR A WORK MACHINE

TECHNICAL FIELD

This invention relates to a suspension system for a work machine having a pair of adjustable track roller frame assemblies.

BACKGROUND ART

Typical agricultural work machines are commonly supported and propelled by pneumatic tires. Pneumatic tires provide a great deal of cushioning or bounce as these machines encounter disparities in the surface of the soil the machines are working. These machines have therefore not required or have not been provided with suspension systems.

Steel track laying machines have long been used in earthworking, construction, and agriculture, because of the benefits of improved traction and reduced soil compaction. However, these machines are heavy and much slower moving than the pneumatic tired machines and work in environments not requiring suspension to any great degree.

With the introduction and acceptance of endless elastomeric track laying machines in the agriculture industry, new challenges have arisen. These track laying machines have been designed to perform the same operations as the pneumatic tired machines while offering benefits provided by the steel track laying counterparts. However, these machines need to be flexible to change between a variety of row crop spacing and travel at higher operating speeds for roading the work machine between different fields. Therefore, it is desirable to have a support system that is flexible and readily adaptable to varied row crop spacing, and provides suspension to reduce the shocks to the machine and operator.

The present invention is directed to overcome one or more of the problems as set forth above.

DISCLOSURE OF THE INVENTION

In one aspect of the present invention a suspension system for connecting and supporting a track laying work machine on first and second track roller frames is provided. The suspension system is comprised of an elongated beam that has a first end portion, a second end portion, and a middle portion. A means is included for connecting each of the track roller frames to a respective end portion of the support beam. First and second suspension members support the main frame of the work machine and support the middle portion of the elongated beam. The first and second suspension members allowing the main frame to float with respect to the elongated beam.

In another aspect of the present invention a work machine comprises a main frame, an engine having a transmission and a final drive. The final drive is operatively connected to the main frame and defines an axis. First and second track roller frames are laterally spaced apart on opposite sides of the work machine. A pair of drive wheels each is drivingly and axially movably attached to the final drive. Each of the drive wheels is connected to a hub assembly. The hub assemblies are connected to the first and second track roller frames. An elongated beam has a first end portion, a second end portion, and a middle portion. The end portions are connected to each of the track roller frames. First and second suspension members support the main frame of the work machine and the elongated beam. The first and second suspension members allow the main frame to float with respect to the elongated beam.

In yet another aspect of the present invention a suspension system for a work machine is provided. The work machine has an operator's station, a main frame, an engine, a transmission, and a final drive. The final drive defines an axis. The suspension system comprises an undercarriage assembly. The undercarriage assembly includes an elongated beam, first and second track roller frames that are fixedly and axially movably attached to the elongated beam on each of an opposite side of the main frame. A pair of idler wheels and a pair of drive wheels one each are attached to the first and second track roller frames. The drive wheels are drivingly and axially movably attached to the final drive. First and second suspension members support the main frame of the work machine and supported by the elongated beam. The first and second suspension members cushion the pivotal movement of the undercarriage about the axis that is defined by the final drive.

BEST MODE FOR CARRYING OUT THE INVENTION

Figure 1:
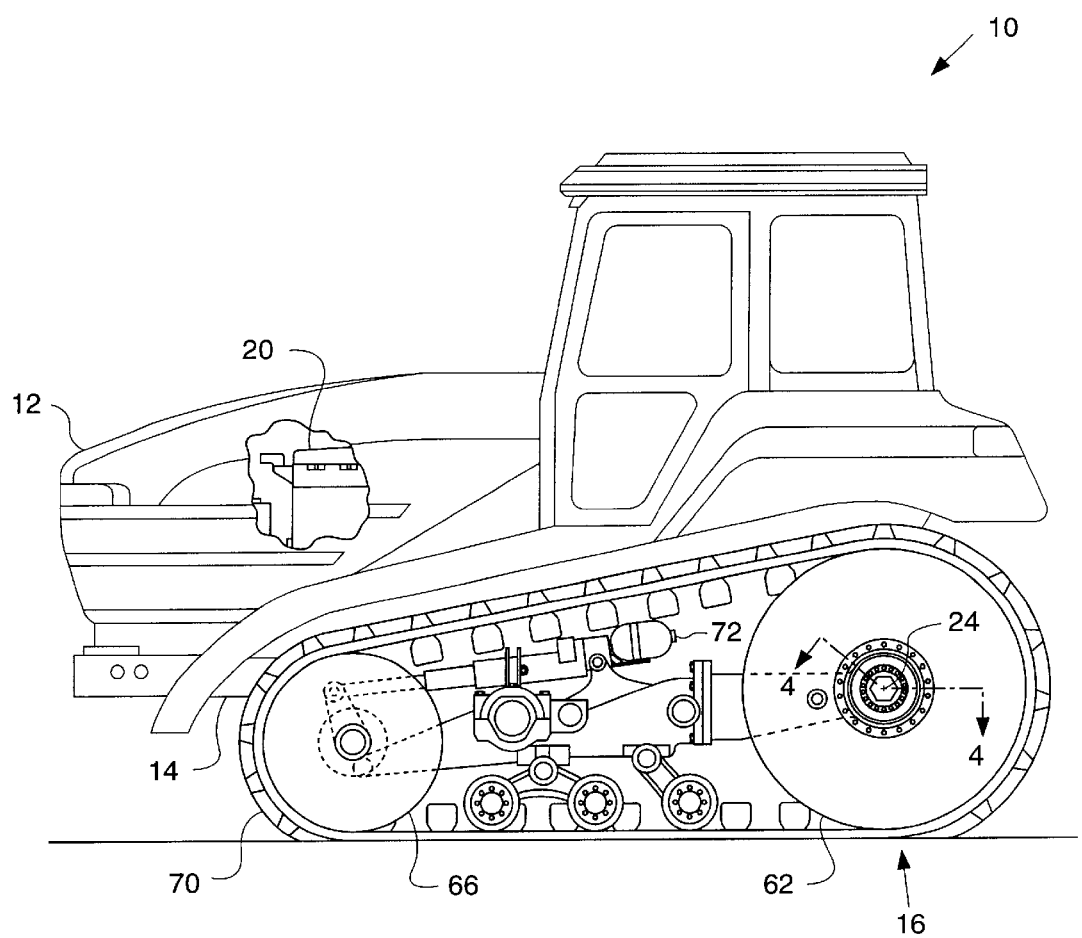
FIG. 1 is a side elevational view of a work machine embodying the present invention.
Figure 4:
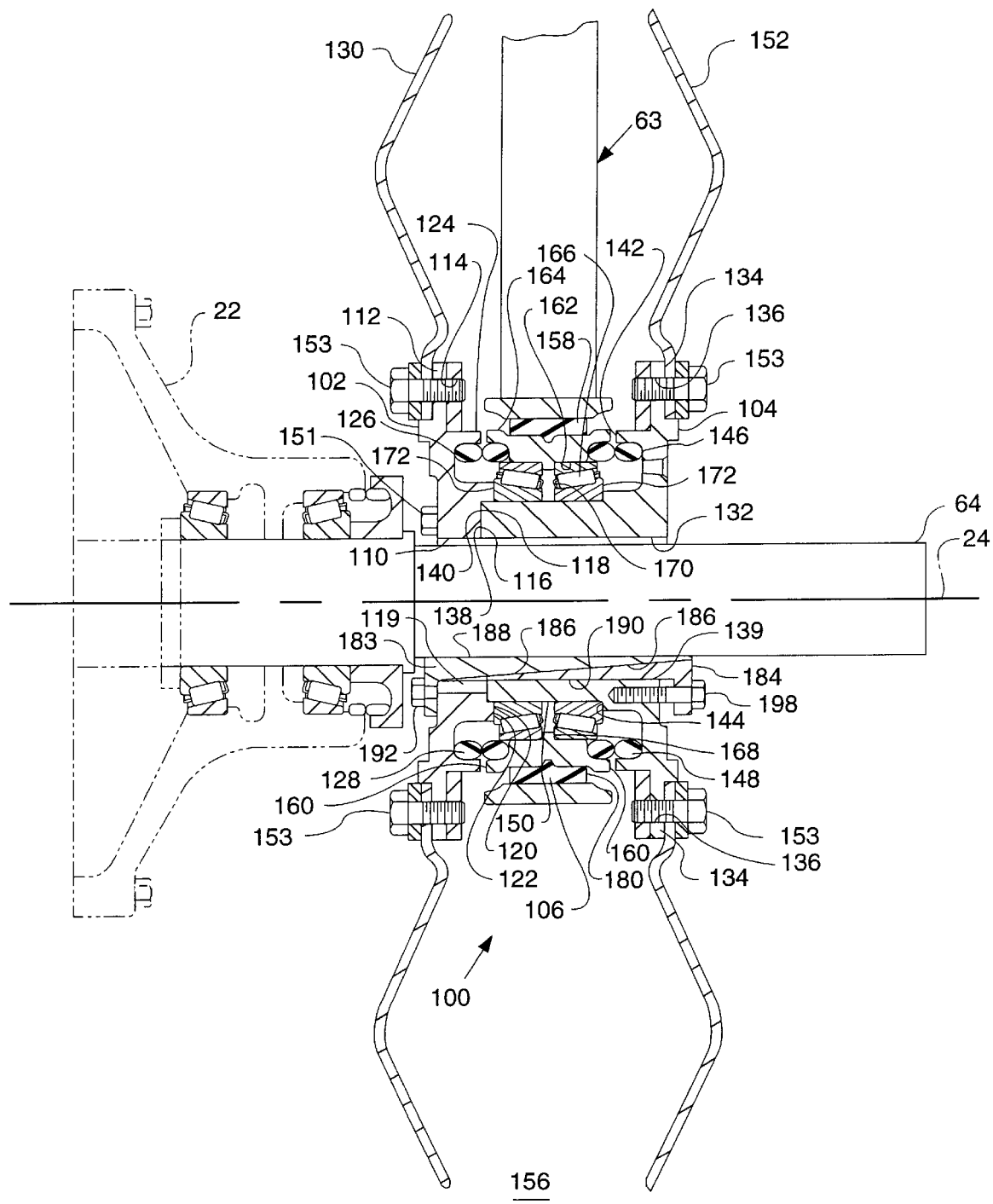
FIG. 4 is an enlarged sectional view of the interface between the drive wheel hub and the roller frame taken along line 4—4 of FIG. 1.

Referring to FIG. 1, a work machine 10 is shown having a body portion 12 supported by a main frame 14 and a rubber belted track system 16. The work machine 10 includes an engine 20, and a transmission not shown, operatively connected to the main frame 14. The final drive 22, as shown in FIG. 4 defines a laterally extending axis 24. The engine 20, transmission, and the final drive 22 are used for driving the rubber belted track system 16 in a conventional manner. As an alternative, the conventional system could be of any scope such as a manual drive system, hydrostatic drive system, or a power shift system.

Figure 3:
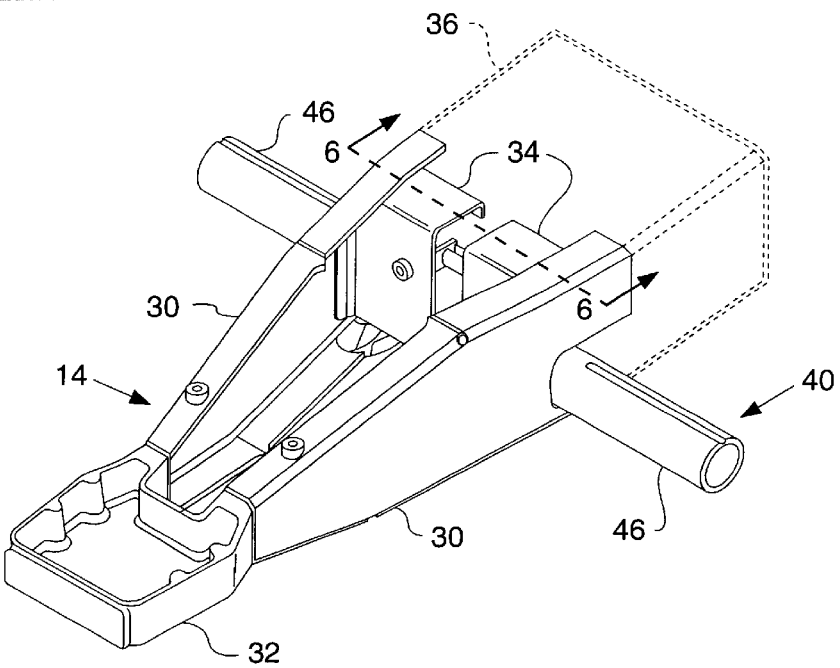
FIG. 3 is a perspective view of a main frame and hard bar.

As best seen in FIG. 3 main frame 14 includes longitudinally extending spaced apart members 30. Side members 30 are connected at a forward end by an engine mounting structure 32. A pair of box member 34 joins the side members 30 at generally the middle portion thereof and is connected thereto by fasteners.

Figure 2:
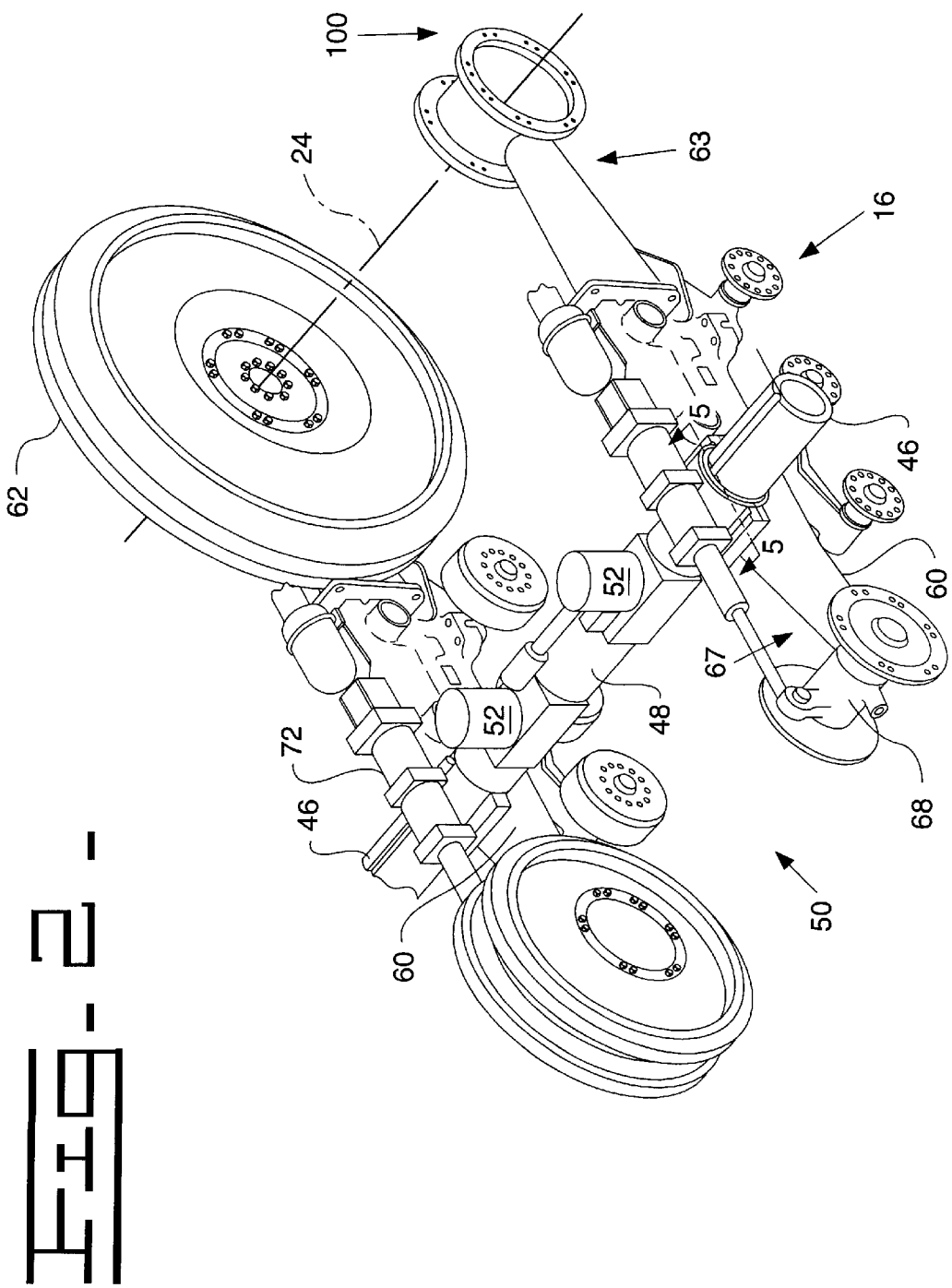
FIG. 2 is a perspective view of roller frames and a support assembly.
Figure 6:
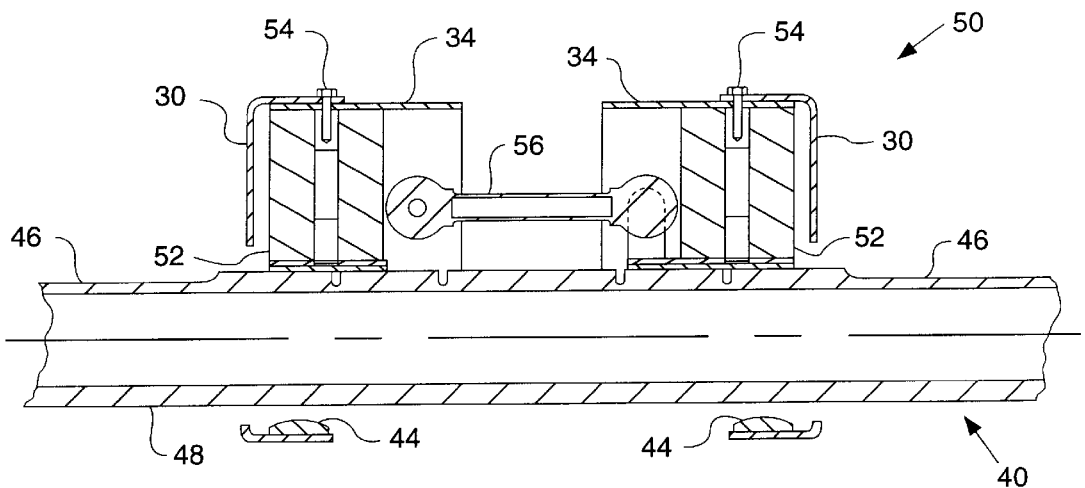
FIG. 6 is an enlarged sectional view of the interface between the support beam and the main frame taken along line 6—6 of FIG. 3.
Figure 6A:
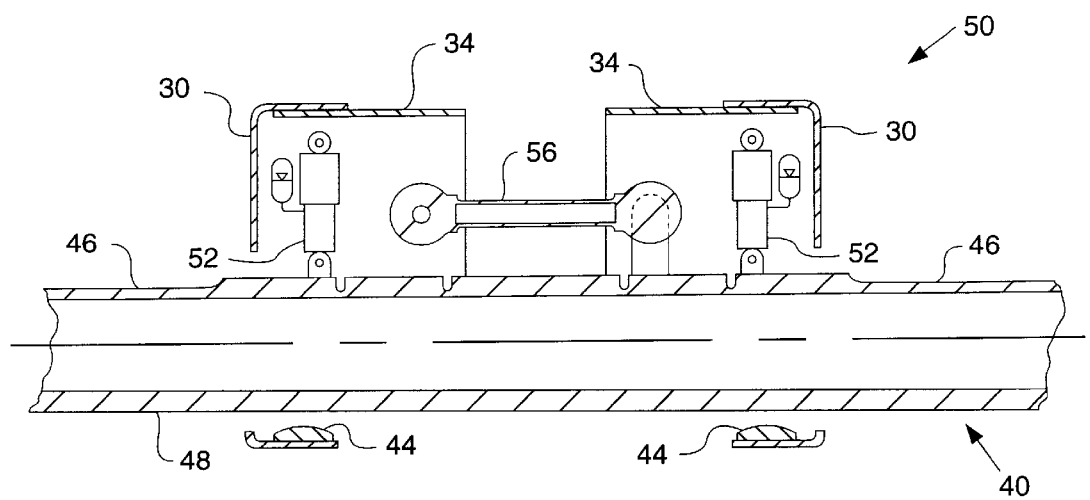
FIG. 6a is an enlarged sectional view of an alternate embodiment of the interface between the support beam and the main frame taken along 6—6 of FIG. 2.

As best seen in FIGS. 2, 3 and 6 a laterally extending elongated beam, referred to herein as a hard bar 40 having a substantially circular cross-section extends between and is supported by the rubber belted track system 16. Hard bar 40 is preferably located within cutouts positioned in side members 30 of main frame 14. A structural transmission 36 is connected to the end of each side member 30 maintaining the spacing therebetween. Rebound pads 44, which in this application are made of an elastomeric material, are positioned directly under the hard bar 40. The rebound pads 44 create a cushion for the hard bar 40 during operation of the work machine 10 so that direct contact between the side members 30 and the hard bar is avoided.

Figure 3A:
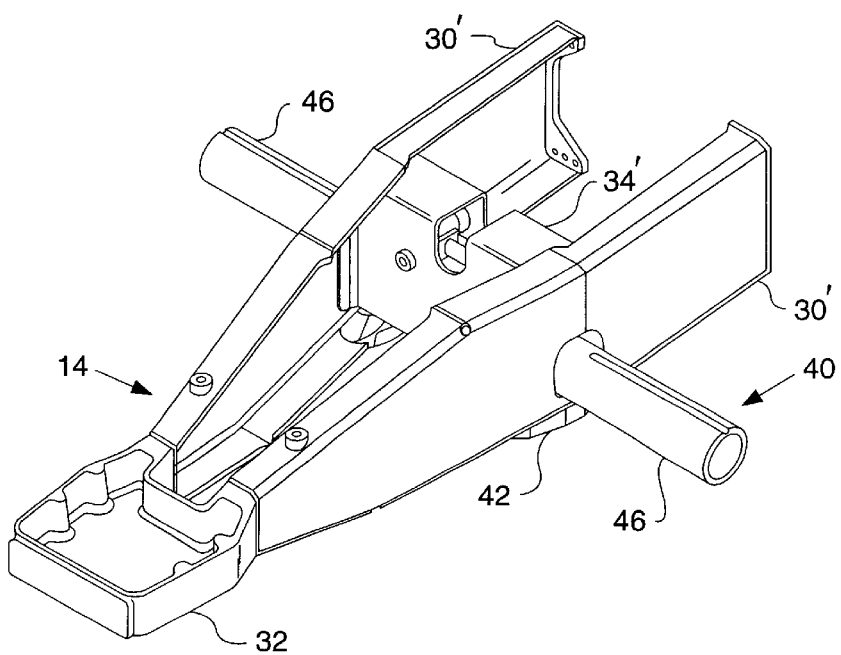
FIG. 3a is a perspective view of an alternative main frame and hard bar.

An alternative arrangement is shown in FIG. 3a, and a prime designation will be used for like elements. Side members 30' are connected in a similar manner at the forward ends by an engine mounting structure 32. A box member 34' joins the side members 30' at generally a middle portion thereof, and is connected thereto by fasteners.

Hard bar 40 is located in inverted "U" shaped cutouts in the underside of side members 30' of main frame 14. Steel plates 42 are fastened as by welding, to the bottom side of side members 30', one each spanning the void created by the inverted "U" shaped cutouts. Rebound pads 44, are connected to the steel plates 42 and are positioned directly under the hard bar 40.

Hard bar 40 has first and second end portions 46 extending beyond the main frame 14 on either side of the work machine 10, and a middle portion 48 is encompassed within the side members 30 of the main frame 14 and the box member 34.

As best shown in FIG. 6 a suspension system 50, includes first and second suspension members 52 positioned on the middle portion 48 of the hard bar 40 and within the pair of box members 34. As alternatively shown in FIG. 3a first and second suspension members 52 are positioned on middle portion 48 of the hard bar 40 within box member 34'. Suspension members 52 are connected with the hard bar 40 and the pair of box members 34 and the box member 34' (in FIG. 3a), for example, by pins 54 projecting from the hard bar 40 and the box members 34. In this manner suspension members 52 are prevented from moving laterally when the weight of the machine 10 is place on the rubber belted track system 16. An anti sway bar 56 is interposed the suspension members 52 in a lateral direction, and the hard bar 40 and the box member 34 in an elevational direction. One end of anti sway bar 56 is pivotally connected to the box members 34, or the box member 34' as shown in FIG. 3a of the main frame 14 and the other end is pivotally connected to the middle portion 48 of the hard bar 40.

Preferably, suspension members 52 are Firestone "MARSH MELLOW SPRINGS", which are a rubber fabric composite having a predetermined stiffness. As an alternative, suspension members 52 could utilize other passive components such as cylinders, pneumatic cylinders, a nitrogen over oil strut, a shock absorber mechanism, or coil springs.

As a further alternative, the suspension system 50 could utilize an active system, not shown, such as a motion accelerometer being attached to the front end of the work machine 10 sending a signal therefrom and feeding data to a controller. Within the controller, the data would be interpreted and fluid would be directed to the cylinders to compensate for the either the upward or downward motion of the front-end of the work machine 10.

The rubber belted track system 16 shown in FIG. 2 is further comprised by first and second track roller frames 60 that are laterally spaced apart on opposing sides of the main frame 14. In as much as the first and second track rollers frames 60 are substantially operatively and structurally similar, further reference will be made to only a single side of the rubber track system 16 and like reference numbers will be used for like components. A drive wheel 62 is rotatably connected to a first end portion 63 of the track roller frame 60 and drivingly connected to an axle 64 as will be discussed later. An idler wheel 66 is pivotally and rotatably connected to a second end portion 67 of track roller frame 60 by swing link 68. An endless rubber track 70 is entrained around the drive wheel 62 and the idler wheel 66 and is tensioned into frictional driving engagement by tension system 72. In this application the drive wheel 62 is positioned near the back of the work machine 10 and the idler wheel 66 is positioned toward the front of the work machine 10.

Figure 5:
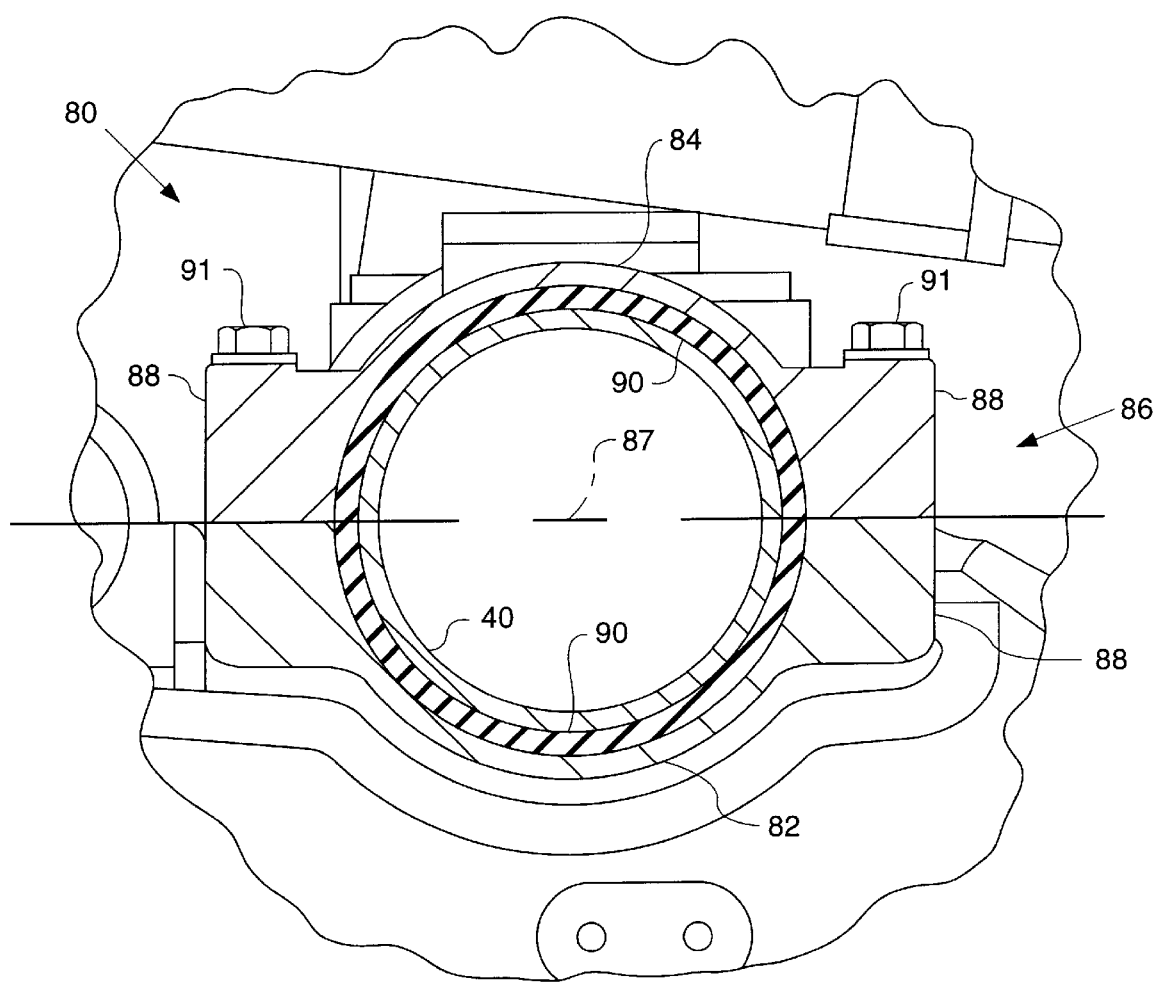
FIG. 5 is an enlarged sectional view of the interface between the support beam and the track roller frame taken along line 5—5 of FIG. 2.

As best seen in FIG. 5, a split collar assembly 80 comprised of a first collar 82 and a second collar 84 provide a connecting means 86 that fixedly attaches the track roller frame 60 to the hard bar 40. Split collar assembly 80 also permits axial adjustment to vary the spacing of the track roller frames 60 or gage setting. A generally horizontal axis 87 is defined by first and second collars 82,84 in an assembled position. First and second collars 82,84 are semi-circular pieces that have axially extending flanges 88 located on opposite ends thereof. A cushioning member 90 is attached to the inner surface of each of the first and second collars 82,84 and provides another component of the suspension system 50. In this application, the cushioning member 90 is an elastomeric material, such as rubber. The first collar 82 is inverted and positioned in a recess in the top of the track roller frame 60 near the second end 67, with the flanges 88 extending parallel to axis 87. The track roller frame 60 is then positioned in relationship to the elongated beam 40 so that the first collar 82 cradles the bottom of the hard bar 40. The second collar 84 is positioned on top of the hard bar 40 directly above the first collar 82. Fasteners 91 are inserted through clearance holes in flanges 88 of the first and second collar 82,84 and thread into the track roller frame 60 fixedly attaching the track roller frame 60 to the hard bar 40.

As best seen in FIGS. 2 and 4, the drive wheel 62 is fixedly attached to a hub 100 through a conventional bolt pattern and fasteners. The hub assembly 100 is drivingly and axially movably connected to the axle 64 that extends outwardly from the final drive 22. For example, the hub 100 is a multi-piece assembly defining an inside portion 102, an outside portion 104, and a center portion 106. The inside portion 102 has a generally cylindrical configuration defining a bore 110 extending therethrough and being centered on the axis 24. A first side portion 112 of inside portion 102 is positioned adjacent the main frame 14 and has a plurality of threaded holes 114 positioned therein being radially spaced about the axis 24. A second side portion 116 is spaced from the first side portion 112 and defines an abutting surface 118 radially extending from the bore 110. A keyway or rectangular groove 119 running parallel to axis 24 is positioned in the bore 110 and extends from the first side portion 112 to the second side portion 116. A first protrusion 120 extends from the second side portion 116 and defines an abutting surface 122 and a second protrusion 124 extends from the second side portion 116. Interposed the first protrusion 120 and the second protrusion 124 is a sealing surface 126 having a seal member 128 positioned in sealing relationship thereto. Extending radially outward and attached to the first side portion 112 of the inside portion 102 is a driving disk 130 which makes up a portion of the drive wheel 62.

Still referring to FIG. 4, the outside portion 104 has a generally cylindrical configuration being centered about the axis 24. The outside portion 104 has a bore 132 extending therethrough being generally sized to that of the bore 110 in the inside portion 102 and is coaxial therewith. A first side portion 134 of the outside portion 104 is positioned away from the main frame 14 and has a plurality of threaded holes 136 positioned therein being coaxial with the plurality of threaded holes 114 in the inside portion 102 and is radially spaced about the axis 24. A second side portion 138 of the outside portion 104 is spaced from the first side portion 134 and defines a first abutting surface 140 radially extending from the bore 132. A keyway or rectangular groove 139 running parallel to axis 24 is positioned in the bore 132 and extends from the first side portion 134 and the second side portion 138 and is coaxially aligned with keyway 119 of the inside portion 102. A protrusion 142 extends from the second side portion 138. Interposed the first abutting surface 140 and the protrusion 142 is a second abutting surface 144. Positioned radially between the second abutting surface 144 and the protrusion 142 is a sealing surface 146 having a sealing member 148 in sealing relationship thereto. Interposed the first abutting surface 140 and the second abutting surface 144 is a bearing surface 150. The inside portion 102 and the outside portion 104 are fixedly attached in a conventional manner by a plurality of fasteners 151. Extending radially outward and attached to the first side portion 134 of the outside portion 104 is a driving disk 152 which makes up a portion of the drive wheel 62. In this application, the driving disks 130,152 are removably attached to the outside portion 104 and the inside portion 102 by a plurality of fasteners 153 in a conventional manner.

The center portion 106 has a generally cylindrical configuration being defined by a cylindrical outer surface 158 extending between a pair of ends 160. The cylindrical outer surface 158 has a pre-established diameter and a pre-established length extending between the pair of ends 160. An inner surface 162 has a generally stepped contour being defined by a sealing surface 164 extending inwardly from each of the pair of ends 160. A bearing surface 166 extends axially inwardly from each of the sealing surfaces 164 and an abutting surface 168 extends radially inwardly from the bearing surfaces 166 to intersect with an axial inner surface 170.

An inner race 172 of a pair of bearings 174 is positioned about the bearing surface 150 of the outside portion 104 and abuts with the second abutting surface 144 of the outside portion 104. The other inner race 172 of the pair of bearings 174 is positioned about the bearing surface 166 of the outside portion 104 and abuts with the abutting surface 122 defined on the first protrusion 120 on the inside portion 102. An outer race 176 of the pair of bearings 174 is positioned in functional relationship with the respective inner race 172 of the pair of bearings 174 and the respective bearing surface 166 and abutting surfaces 168 of the center portion 106.

Positioned about the outer surface 158 of the center portion 106 is a cushioning member 180, which in this application is made of an elastomeric material, such as rubber. The first end portion 63 of the track roller frame 60 is attached to the outer extremity of the cushioning member 180. The first end portion 63 has a pre-established width and a pre-established height to define a pre-established section modulus. The pre-established width of the first end portion 63 is less than the pre-established space 156 formed and separating the driving disk 130 and the driving disk 152.

As best seen in FIG. 4 the hub assembly 100 is drivingly connected to the axle 64 by a fastening system 182. In this application, the fastening system 182 includes first and second wedges 183,184. First and second wedges 183,184 have mating inclined surfaces 186, a planar inner surface 188 frictionally interfacing with the axle 64, and a planar outer surface 190 frictionally interfacing with the keyway 119,139 in the inside portion 102, and the outside portion 104 respectively. The first of wedge 183 is attached to the inside portion 102 by fasteners 192. Fasteners 192 extend through a pair of holes 194 in the first wedge 183 and threadably attach to a pair of threaded holes 196 in the inside portion 102. The second wedge 184 is drawn into keyway 139 of outside portion 104 by fastener 198. The movement of the mating incline surfaces 186 of the first and second wedges 183,184 moves the hub assembly into driving engagement with the axle 64.

Industrial Applicability

With the present configuration, a suspension system 50 is provided for a work machine 10 that reduces operator shock loads that are encountered during normal operation. The suspension system 50 allows the track roller frames 60 to be moved along the first and second end portions 46 of the hard bar 40 defining a gage setting for the work machine 10.

The suspension system 50 functions as follows. When the weight of the work machine 10 is placed on the rubber belted track system 16, the body portion 12 of the work machine 10 pivots about the axis 24. The first and second suspension members 52 suspend the hard bar 40 between rebound pads 44 and the cutouts in side members 30. In this position the first and second suspension members 52 are preloaded and allow the main frame 14 and the body portion 12 to float with respect to the hard bar 40.

In operation, when the work machine 10 is operating in a forward direction the track roller frames 60, either singly or together, will encounter disparities in the surface of the ground being worked. If a single obstacle is encountered the respective idler wheel 66 and the second end portion 67 of a track roller frame 60 will be forced in an upward direction causing the track roller frame 60 to pivot about the axis 24 defined by the final drive 22. The respective suspension member 52 will deform in response to the magnitude of this upward force, thereby dampening the force transmitted to the main frame 14 and the operator. The pivotal movement of the track roller frame 60 will exert a moment on the hard bar 40. The cushioning member 90 attached to the inner surface of the first and second collars 82,84 of the split collar assembly 80 will deform elastically, thereby reducing the twisting action exerted on the hard bar 40. In this manner the wrapping action of the hard bar 40, or twisting between track roller frames 60 is minimized. This reduces the possibility of the hard bar 40 acting as a torque tube allowing the torque acting on one track roller frame 60 to be transmitted to the opposing track roller frame 60.

In the event that both track roller frames encounter the same disparity simultaneously, both idler wheels 66 and the second end portions 67 of the track roller frames 60 will be forced in an upward direction. First and second track roller frames 60 will pivot about the axis 24 defined by the final drive 22, thereby pushing up against the hard bar 40. First and second suspension members 50 will deform in response to the magnitude of this upward force, dampening the force transmitted to the main frame 14 and the operator.

After the idler wheels 66 individually or simultaneously traverse the disparity, the drive wheels 62 will then encounter the same obstacle. Each of the driving disks 130,152 of the drive wheel 62 will be forced upward, pushing against the hub assembly 100 and causing the cushioning member 180 to deform. The deformation of cushioning member 180 reduces the loads that act on the bearings 174 and the final drive 22.

Additional benefits of the hub assembly 100 supported generally about its center is that the track roller frame 60, the drive wheel 62, the idler wheel 66, and the endless belt 70 form an integral assembly. This assembly can be detached from the main frame 12 while the endless belt 70 remains tensioned by the tensioning system 72. Making gage changes easier and more efficient. Furthermore, with the second end portion 67, including the cushioning member 90, being positioned about the center portion 106 of the hub assembly 100, a variation or mis-alignment of the track roller frame 60 to the pair of bearings 174 allow for less than a prefect gage adjustment or alignment.

Changing the gage setting of the work machine 10 is performed as follows. First one of the track roller frames 60 of the rubber belted track system 16 is elevated so that it is no longer in ground engaging contact. Fasteners 91 are loosened releasing the attachment of the first and second collars 82,84 from the hard bar 40. Fastener 198 is then loosened moving the second wedge 184 out of keyways 119,139. By moving the second wedge 184 away from the first wedge 183 the driving connection of the drive wheel 62 to the axle 64 is freed. The track roller frame 60, drive wheel 62, idler wheel 66, and the endless rubber track 70 is then urged either inward towards the main frame 14 or outward depending on the gage setting desired, Fasteners 91 and fasteners 198 are then tightened reversing the process. The identical process is performed on the other side of the work machine to completing the gage changing procedure.

Other aspects, objects and advantages of this invention can be obtained from a study of the drawings, written description, and the appended claims.

What is claimed is:

1. A suspension system for connecting and supporting a work machine on first and second track roller assemblies, said suspension system comprising:
   an elongated beam having first and second end portions, and a middle portion;
   means for releasably axially movably connecting each of the track roller assemblies to a respective end portion of said elongated beam and a drive axle, wherein said track roller assemblies define a variable gage setting; and
   at least one suspension member supporting a main frame of said work machine and supported by said middle portion of said elongated beam, said suspension member allowing said main frame to float with respect to said elongated beam.

2. The suspension system of claim 1 wherein said elongated beam has a substantially circular configuration in cross-section along its entire length.

3. The suspension system of claim 1 wherein said connecting means includes split collar assemblies.

4. The suspension system of claim 3 wherein said split collar assemblies further including an elastomeric material separating an inside surface of said first and second split collar assemblies from said elongated beam, wherein said elastomeric material provides torsional deflection.

5. The suspension system of claim 1 wherein said suspension members are passive components.

6. The suspension system of claim 1 wherein said suspension members are a rubber fabric composite.

7. The suspension system of claim 1 wherein said suspension members are nitrogen over oil struts.

8. The suspension system of claim 1 wherein said suspension members are actively controlled.

9. A work machine comprising:
   a main frame;
   a final drive operatively connected to the main frame, said final drive defining an axis;
   first and second track roller frames having first and second end portions, said first and second track roller frames being laterally spaced apart on opposite sides of the main frame and define a variable gage setting;
   drive wheels being drivingly axially movably connected with said final drive, each of said drive wheels having a hub assembly, said hub assemblies being connected with said first and second track roller frames;
   an elongated beam having first and second end portions, and a middle portion;
   a respective end portion of said elongated beam being slidably and releasably connected with each of said track roller frames; and
   at least one suspension member supporting said main frame of said work machine and supported by said middle portion of said elongated beam, said suspension member allowing said main frame to float with respect to said elongated beam.

10. The work machine of claim 9 wherein said elongated beam has a substantially circular configuration in cross-section.

11. The work machine of claim 9, wherein said at least one suspension member is a rubber fabric composite.

12. The work machine of claim 9 wherein said at least one suspension member is a cylinder.

13. The work machine of claim 12 wherein said cylinder has a fixed dampening characteristic.

14. The work machine of claim 12 wherein said cylinder has a variable dampening characteristic.

15. The work machine of claim 14 wherein said variable dampening characteristic is defined by hydraulic cylinders and an accumulator.

16. The work machine of claim 15 wherein said accumulator is adjustable.

17. The work machine of claim 9, further comprising first and second split collars surrounding said elongated beam, each of said split collars mating with a recess in said first and second track roller frames and secured thereto by fasteners.

18. The work machine of claim 17 wherein said first and second split collars further include an elastomeric material separating an inside surface of said first and second split collars from said elongated beam.

19. The work machine of claim 9 further comprising a cushioning member interposed the first end portion of the first and second track roller frames and the hub assembly.

20. A suspension system for a work machine having a main frame, and a final drive defining an axis, said final drive being connected to the main frame, said suspension system comprising:
   an undercarriage assembly having an elongated beam, first and second track roller frames slidably and releasably attached to the elongated beam on opposite sides of the main frame and define a variable gage setting, a pair of idler wheels and a pair of drive wheels being attached to said first and second track roller frames, said drive wheels being drivingly axially movably attached to the final drive; and
   first and second suspension members supporting said main frame of said work machine and supported by said elongated beam, said first and second suspension members cushioning pivotal movement of the main frame about the axis defined by the final drive relative to the undercarriage.

21. The suspension system of claim 2 wherein said connecting means further includes a hub assembly that is drivingly and axially movably connected to said drive axle.

* * * * *